Sept. 11, 1928.

T. A. RICH 1,684,243

MEASURING DEVICE

Filed June 25, 1926

Inventor
Theodore A. Rich
by
His Attorney.

Patented Sept. 11, 1928.

1,684,243

UNITED STATES PATENT OFFICE.

THEODORE A. RICH, OF EAST LYNN, MASSACHUSETTS, ASSIGNOR TO GENERAL ELECTRIC COMPANY, A CORPORATION OF NEW YORK.

MEASURING DEVICE.

Application filed June 25, 1926. Serial No. 118,583.

My invention relates to measuring devices and in particular to a measuring device which may be used for many different purposes with only a slight change in one or more of its minor parts.

In carrying my invention into effect I make use of relatively rotatable inducing and induced members preferably of the induction disc type, the disc of which may be driven at a constant speed. The inducing magnet cooperating with the disc may then produce a flux proportional to the quantity to be measured. The drag between the disc and the magnet may operate against a spring to produce a deflection in the manner hereinafter explained. Another feature of my invention consists in novel differential torque measuring means as used in my measuring device.

Figure 1:
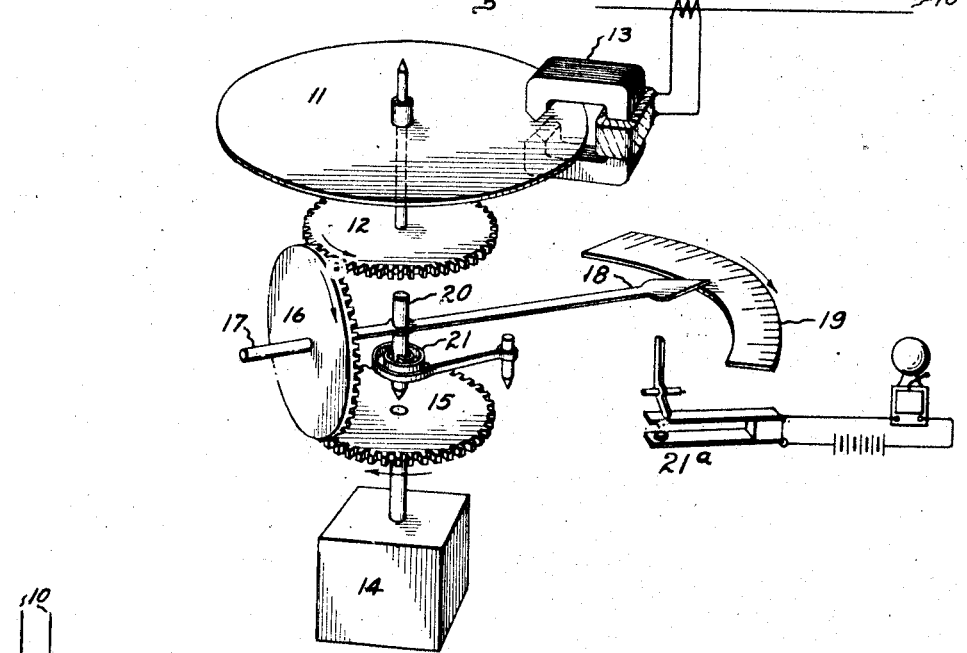
Figure 2:
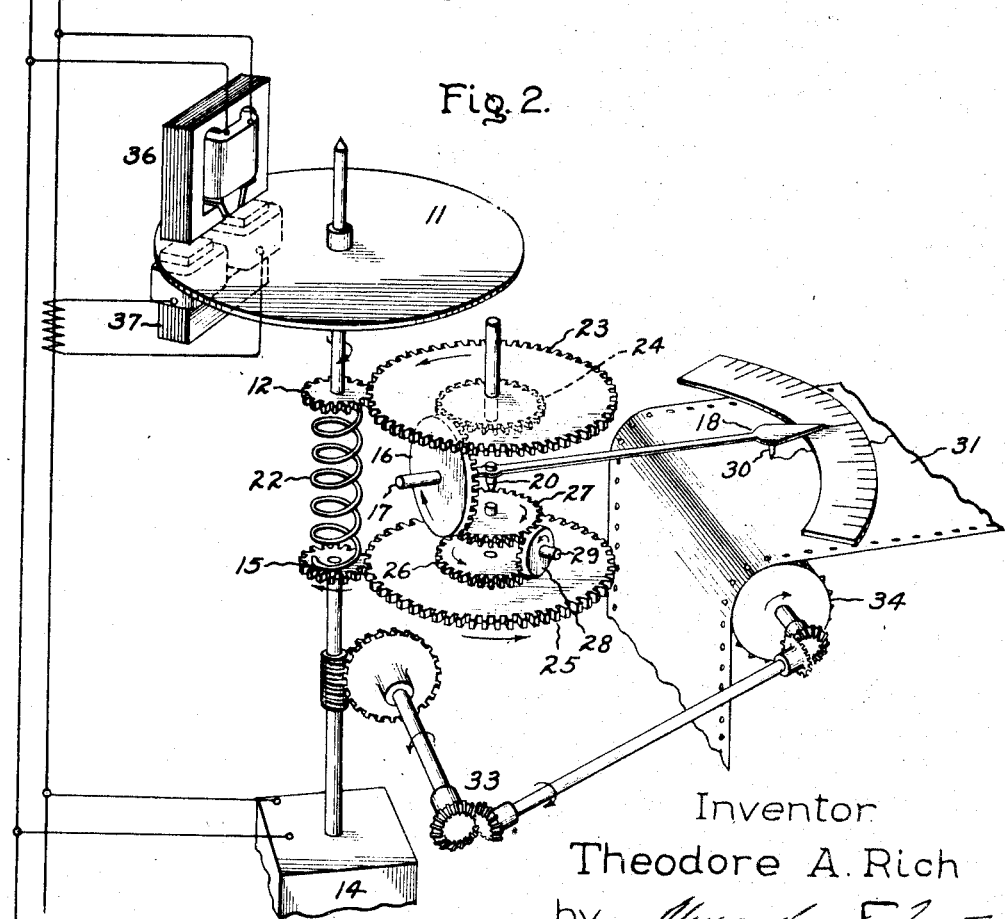

The features of my invention which are believed to be novel and patentable will be pointed out in the claims appended hereto. For a better understanding of my invention, reference is made in the following description to the accompanying drawings: Fig. 1 of which illustrates my invention as used for measuring current and Fig. 2 illustrates the invention as used for a curve drawing wattmeter.

In Fig. 1 I have represented one embodiment of my invention as used for measuring the current flowing in a circuit 10. The device has an induction disc 11 rotatably mounted with a gear wheel 12. An electromagnet 13 embraces the periphery of the disc and produces a flux therethrough which is proportional to the current flowing in circuit 10. A constant speed motor 14 drives gear wheel 15 which is similar to 12 and placed in axial alinement therewith. These two gear wheels, together with a connecting gear wheel 16, form a differential. The central wheel 16 is free to rotate on a shaft 20 pivoted in alinement with the axis of wheels 12 and 15. The opposite end 18 of shaft 17 serves as a pointer which cooperates with a stationary scale 19. The shaft 20 is free to rotate against the tension of a torsional spring 21 secured between the shaft and a stationary part of the device.

The operation of this device is as follows: The motor 14 which may be any kind of a constant speed motor drives the connected gear wheels and disc 11 as indicated by the arrows, preferably at a relatively high speed. If there is no current flowing in circuit 10 there will be no flux cutting the disc 11 and it will be free to rotate. Under these conditions the only power transmitted to gear 12 is that sufficient to overcome the friction thereof. Under these conditions the torsional spring 21 and the scale 19 are so adjusted and positioned that pointer 18 indicates zero on the scale 19. Now let us assume that current flows in circuit 10. It will produce a flux cutting disc 11 which is proportional to such current. This flux produces eddy currents in the disc and a damping effect which is proportional to the square of the current. The motor 14 which maintains its constant speed, is thereupon called upon to develop more torque which is transmitted through the differential to disc 11. Since the differential is now called upon to transmit an appreciable torque it rotates shaft 20 in a clockwise direction, winding up spring 21 until the tension thereof is sufficient to balance the force tending to wind it up. This force is proportional to the drag upon disc 11 and to the current flowing in circuit 10 and the action produces a deflection of pointer 18 with respect to scale 19 which when calibrated gives an indication of the current flowing in circuit 10. The spring 21 and the wheel 16 with the interconnected parts form a resilient driving connection between the motor 14 and the disc 11.

It will be noted that the speed of disc 11 is always equal to or proportional to that of motor 14 except when a variation in torque occurs and causes a small momentary movement of the central member of the differential. Since motor 14 is a constant speed motor the drag on disc 11 is therefore proportional to the square of the current in circuit 10. For the same reason the friction of the device is constant and therefore offers no difficulty. The device is very easily adjusted for calibration purposes. Thus if the device gives too great a deflection the magnet 13 may be moved toward the center of the disc 11 or the speed of motor 14 may be lowered slightly. The device may serve as a relay either with or without the scale 19. Thus I have represented contacts at 21ª arranged to be closed by the pointer 18 when it exceeds a predetermined deflection.

If it is desired to measure voltage instead of current it is only necessary to connect the electromagnet 13 across circuit 10 and recalibrate. Any other quantity may be measured by making the current of electromagnet 13 proportional thereto.

In Fig. 2 the same general principles are employed but with a different arrangement of the differential. Here a torsional spring 22 is connected directly between the gears 12 and 15 respectively connected to the disc 11 and motor 14. Wheel 12 is connected with gear 23 which is integral with the upper gear 24 of a differential. The wheel 15 is connected with gear 25 integral with gear 26. The lower gear 27 of the differential is driven from gear 26 through a pinion 28 mounted on a stationary shaft 29, this arrangement being merely to reverse the direction of rotation between gears 26 and 27 so that the direction will be proper for the operation of the differential. The central gear 16 of the differential is mounted on the shaft 17 which is pivoted for rotation with a shaft 20 in the same manner as shown in Fig. 1. The pointer 18 serves in addition as the pointer of a curve drawing instrument and has a stylus 30 cooperating with a chart 31. Since the motor 14 is a constant speed motor it may be utilized to advantage for moving the chart 31 at a constant rate and for this purpose a driving connection 33 is represented between the motor and the driving drum 34 for the chart. The electromagnets adjacent the disc 11 comprise the driving element of an induction wattmeter. The potential electromagnet 36 has its coil connected across the line 10 and the current electromagnet 37 has its coil excited by a current proportional to that flowing in circuit 10. This wattmeter element is arranged to produce a torque on the disc 11 opposite to the direction of rotation, which torque is proportional to watts. The torque transmitted through spring 22 will therefore be proportional to the watts and the pointer 18 will have a deflection corresponding to watts.

It will be evident that by making the speed of the disc high a very small damping or counter-torque flux on the disc 11 will produce considerable torque at the pointer 18 because the torque transmitted through the differential will be proportional to the speed. Furthermore this torque may be further amplified by using reduction gears in the differential as shown in Fig. 2.

In Fig. 1 the pole faces of the magnet 13 are preferably made wedge-shaped as shown to concentrate the flux since the damping is proportional to the square of the flux density. This modification might be used to measure speed; for example, the flux of magnet 13 could be made constant and the gear 15 driven at the speed which is to be measured, in which case the deflection of pointer 18 would be proportional to the speed of wheel 15. Where the flux of the magnet 13 is to be constant a permanent magnet will be preferable.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:

1. A measuring device comprising an induced member and an inducing member for producing a variable flux cutting said induced member, said members being relatively rotatable with respect to each other, means for driving one of said members at a constant speed, and power transmitting means through which the driven member is driven for measuring the torque between said two members.

2. A measuring device comprising a rotating induced member and a stationary inducing member for producing a variable flux cutting said induced member, means for driving said induced member, and resilient means through which the induced member is driven for measuring the torque between said members.

3. A measuring device comprising a rotary induced member, a source of supply and a stationary inducing member supplied from said source for producing a flux cutting said induced member, said flux varying with a quantity to be measured, means for driving said induced member at a constant speed, and differential means through which the induced member is driven for measuring the torque between said two members in terms of the quantity to be measured.

4. The method of measuring electrical quantities which consists in producing a flux proportional to such quantity, causing said flux to cut an induced member and measuring the force necessary to drive said induced member at a constant speed against the retarding action of such flux.

5. The method of measurement which consists in producing in an induction damping system a retarding flux proportional to the quantity to be measured and measuring the force necessary to operate said damping system at a constant rate.

6. A measuring device comprising a constant speed motor, an induced member driven by said motor, means for producing a retarding flux proportional to a quantity to be measured in said induced member and a resilient driving connection between said motor and induced member arranged to be displaced in proportion to the power transmitted therethrough.

7. A measuring device comprising a motor, an induced member driven thereby, means for producing a retarding flux in said member, said flux varying with a quantity to be measured, a resilient driving connection between said motor and induced member, and differential means connected between the two ends of the torsional driving connection for measuring the torque on said driving connection.

8. A measuring device comprising a motor, an induction damping system comprising relatively rotatable induced and inducing members, one of which is stationary and the other of which is driven by said motor at a constant speed, the flux of the inducing member varying with a quantity to be measured, a resilient driving connection between said motor and the rotatable part of said damping system arranged to be displaced in proportion to the torque transmitted therethrough, and means for indicating such displacement.

9. A measuring device comprising a motor, an induction disc driven thereby, a resilient torsional driving connection between said motor and disc arranged to have its two ends relatively displaced in proportion to the torque transmitted therethrough, means for producing a retarding flux in said disc which is proportional to a quantity to be measured, a mechanical differential arranged to have its two ends driven from the two ends of said resilient driving connection such that the central member of the differential remains stationary when the two ends of the torsional driving connection operate at exactly the same speed, and means operated by the central member of the differential for indicating the relative displacement of the two ends of said torsional driving connection.

10. A measuring device comprising a constant speed motor, an induction disc driven thereby, a resilient torsional driving connection between said motor and disc arranged to have its two ends relatively displaced in proportion to the power transmitted therethrough, means for producing a retarding flux in said disc proportional to a quantity to be measured, and differential means arranged to measure the relative displacement between the two ends of said torsional driving connection in terms of the quantity being measured.

In witness whereof, I have hereunto set my hand this 23rd day of June, 1926.

THEODORE A. RICH.